(12) United States Patent
Wang

(10) Patent No.: US 7,916,122 B2
(45) Date of Patent: Mar. 29, 2011

(54) ROLLER MECHANISM FOR MULTIPLE DIRECTIONS CONTROL

(75) Inventor: Wei-Chuan Wang, Taipei (TW)

(73) Assignee: Kye Systems Corp., Taipei (TW)

( * ) Notice: Subject to any disclaimer, the term of this patent is extended or adjusted under 35 U.S.C. 154(b) by 833 days.

(21) Appl. No.: 11/261,467

(22) Filed: Oct. 31, 2005

(65) Prior Publication Data

US 2007/0097075 A1     May 3, 2007

(51) Int. Cl.
*G06F 3/033*     (2006.01)
*G09G 5/08*     (2006.01)

(52) U.S. Cl. .......................... 345/163; 345/164

(58) Field of Classification Search ........... 345/156–184, 345/163
See application file for complete search history.

(56) References Cited

U.S. PATENT DOCUMENTS

| | | | |
|---|---|---|---|
| 7,151,527 B2 * | 12/2006 | Culver | 345/157 |
| 2002/0158844 A1 * | 10/2002 | McLoone et al. | 345/163 |
| 2003/0025673 A1 * | 2/2003 | Ledbetter et al. | 345/163 |
| 2004/0174336 A1 * | 9/2004 | Bohn | 345/156 |
| 2005/0110759 A1 * | 5/2005 | Koo | 345/163 |
| 2005/0146500 A1 * | 7/2005 | Cheng | 345/163 |
| 2005/0231463 A1 * | 10/2005 | Yang | 345/156 |
| 2005/0270271 A1 * | 12/2005 | Bohn | 345/163 |
| 2006/0290671 A1 * | 12/2006 | Bohn et al. | 345/163 |

* cited by examiner

*Primary Examiner* — Chanh Nguyen
*Assistant Examiner* — Kwang-Su Yang
(74) *Attorney, Agent, or Firm* — Bacon & Thomas, PLLC

(57) ABSTRACT

The present invention relates to a roller mechanism for generating a plurality of control signals, for example to scroll an image on a computer display in multiple directions. The roller mechanism has a carriage, and a roller rotatable within the carrier. The roller can drive an encoding unit to output the control signal. The carriage has a coupling portion, and the coupling portion is pivoted to a bottom support. Thus the roller and the carriage are turnable relative to the coupling portion in a fan-shaped movement while the roller is also being rotated within the carriage.

15 Claims, 13 Drawing Sheets

ROLLER MECHANISM FOR MULTIPLE DIRECTIONS CONTROL

BACKGROUND OF THE INVENTION

1. Field of the Invention

The present invention relates to a roller mechanism for generating a plurality of control signals. The control signals may be used for scrolling an image on a computer display in multiple directions.

2. Description of the Prior Art

GUI (graphical user interface) controls have been widely applied to a variety of devices, including computers, telephones, televisions, hand-held devices or the like. For example, U.S. Pat. No. 5,530,455 discloses a pioneering utilization of a roller in a computer input device for scrolling an image on a computer display either in a horizontal and vertical direction. However the scrolling direction is limited to a one specified direction at a time, or the cursor has to be moved to the other scrolling bar such that the computer will verify a desired scrolling direction.

In order to overcome the inconvenience mentioned above, U.S. Pat. No. 6,700,564 discloses a laterally movable roller, thereby providing an adding movement direction. However, this arrangement suffers the disadvantage that the laterally movable roller is difficult to use, prompting a further improvement described in U.S. Patent Publication No. 2003/0025673. The further improvement is that the light emitter and a light receiver used to sense movement are located within a large roller to facilitate manipulation of the roller. While more convenient to use, the input device with the light emitter and receiver within the roller is a relatively costly mechanism, particularly when the input device in which it is used is miniaturized.

Yet another improvement is disclosed in U.S. Patent Publication No. 2004/0174336, which utilizes a ball joint coupled to the center of the roller to enable tilting of the roller with a simpler structure. However, due to the tight narrow tolerance of the combination, the simplified structure has a short life span if the user tilts the roller frequently.

SUMMARY OF THE DISCLOSURE

It is accordingly an object of the present invention to provide a roller mechanism with a simple and durable structure, and that may be used for scrolling an image on a computer display in multiple directions.

It is another object of the present invention to provide a roller mechanism suitable for scrolling an image on a computer display in multiple directions, with a lower cost in production.

It is yet another object of the present invention to provide a roller mechanism suitable for scrolling an image on a computer display in multiple directions, and which is easy for a user to operate.

To accomplish the objects mentioned above, the roller mechanism includes a carriage and a roller with a shaft rotatable within the carriage; and an encoding unit driven by the shaft to output a control signal. The first end of the carriage has a coupling portion, and the coupling portion is pivoted to a bottom such that the roller and the carriage is turnable relative to the coupling portion, and the roller move on the shaft with a fan-shaped movement.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
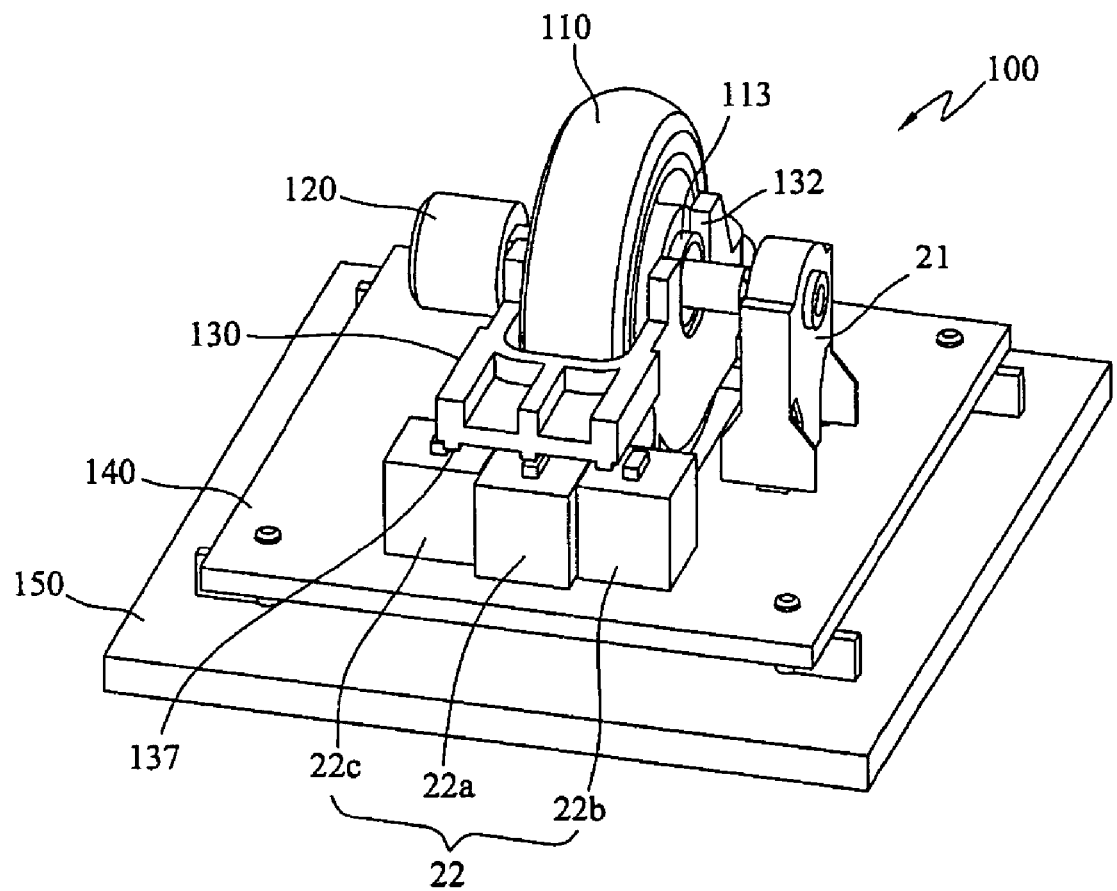
FIG. 1 is a perspective view of a first preferred embodiment of the present invention.
Figure 2A:
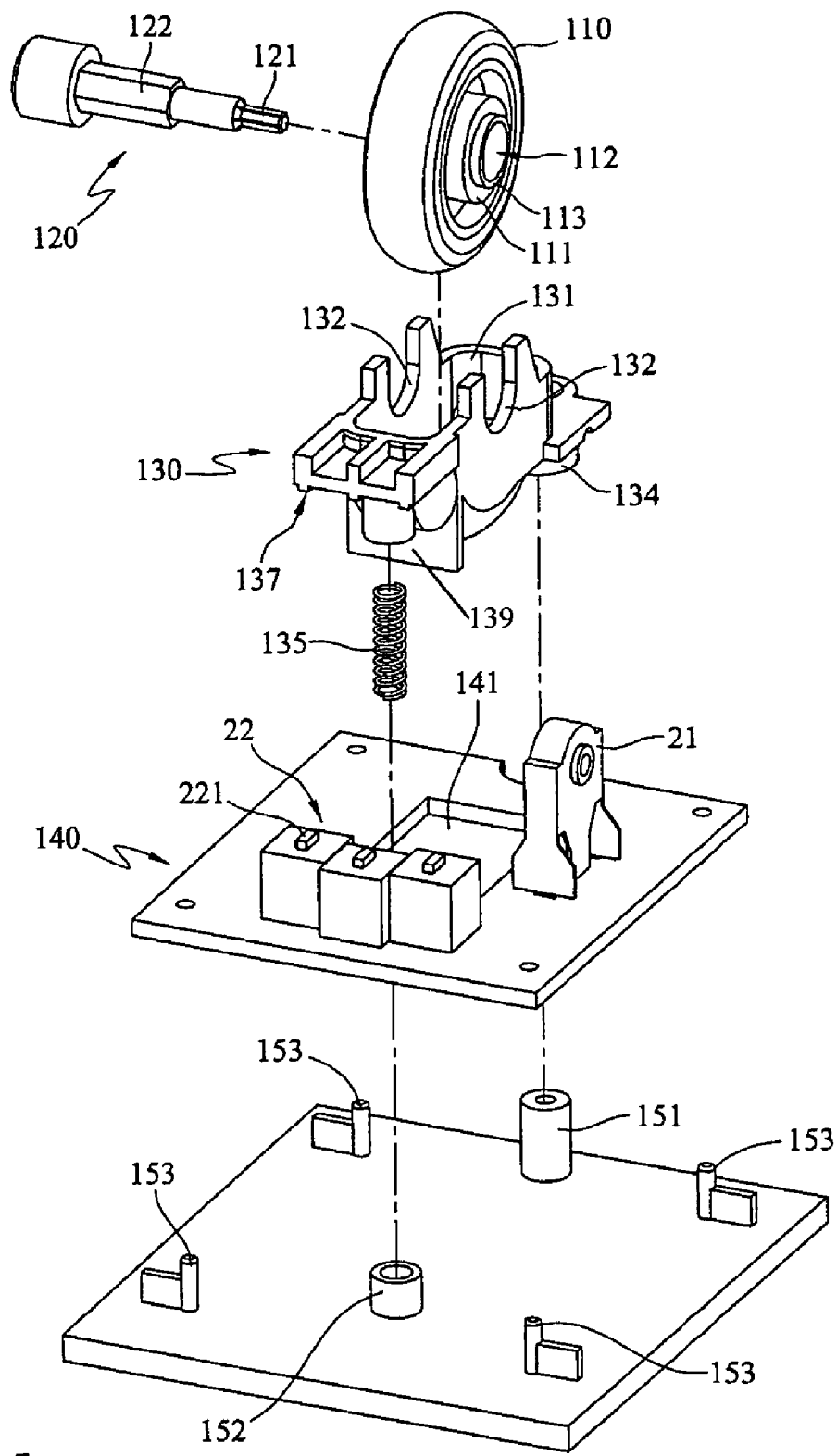
FIGS. 2A and 2B are exploded views of the first preferred embodiment.
Figure 2B:
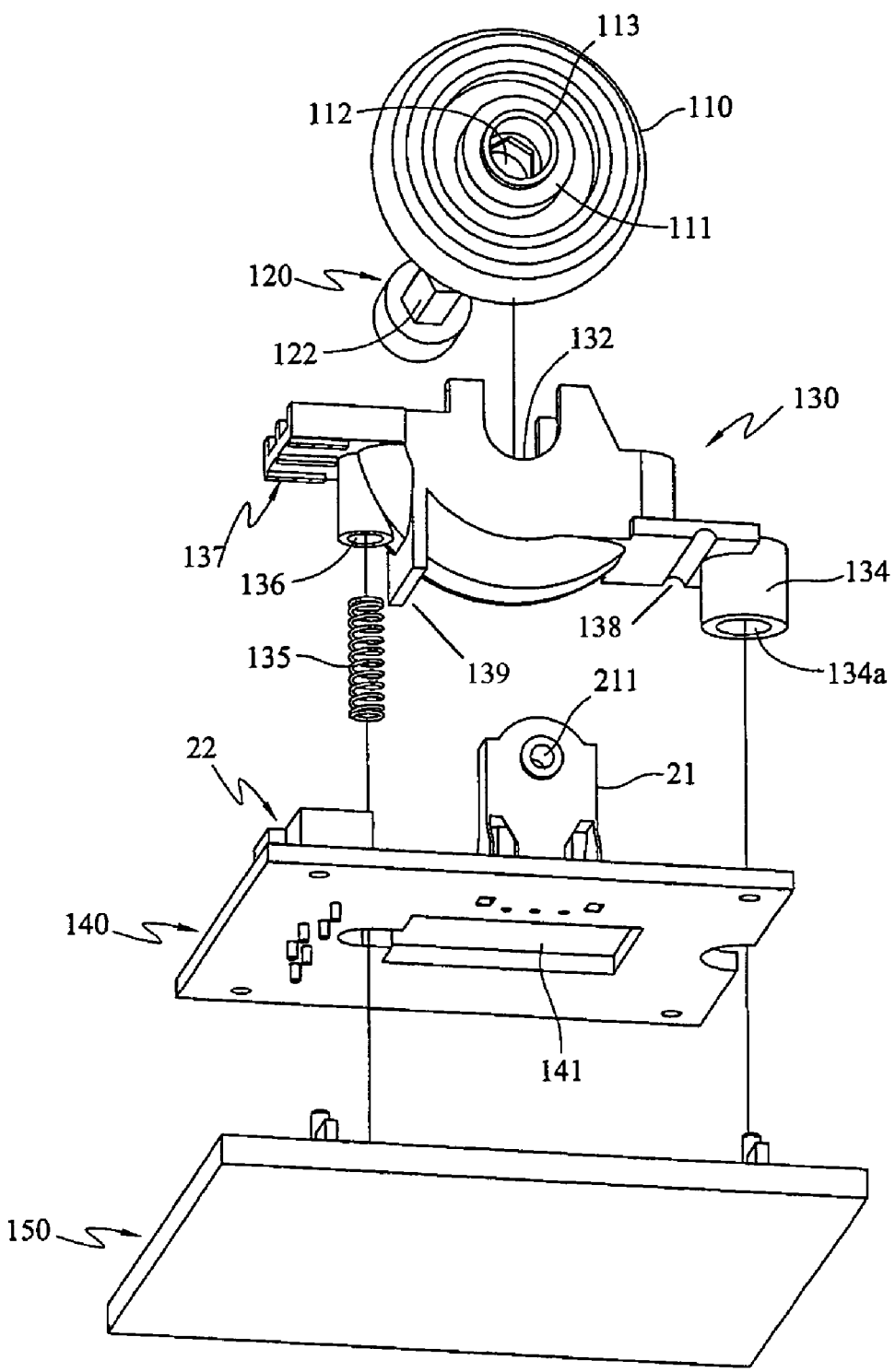
Figure 3:
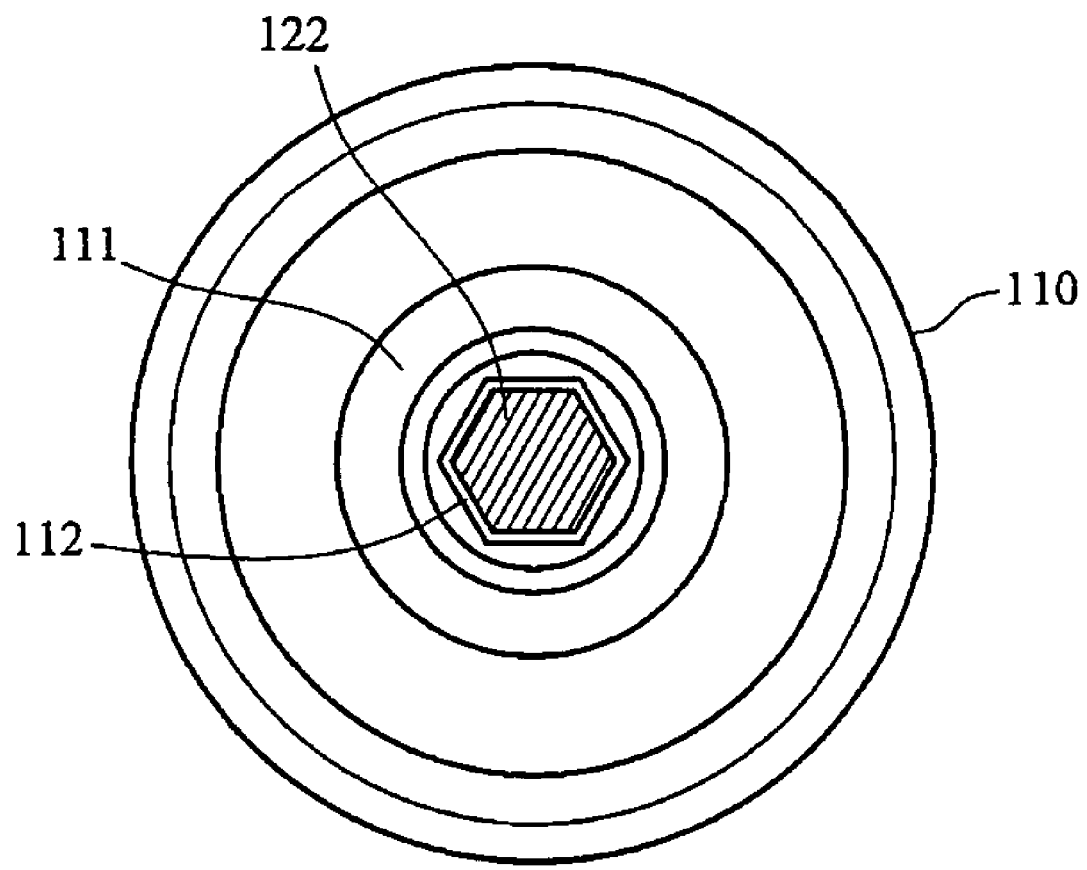
FIG. 3 is a lateral view of a roller that may be used in the first preferred embodiment.

Referring to FIGS. 1, 2A and 2B, the roller mechanism 100 comprises a carriage 130, and a roller 110 with a shaft 120 which is rotatable within the carriage 130. Each side of the roller 110 has a flange 113 such that the roller 110 is mounted in the pair of recesses 132. Each side of the roller 110 further has an inner portion 111 that fits between the pair of recesses 132. The carriage 130 has a coupling portion 134, which is further pivoted to a post 151 extending from a bottom 150 of the roller mechanism such that the roller 110 is both rotatable about the shaft and movable along the shaft 120 while the carriage 130 pivots about the post 151.

Referring to FIG. 2A, the shaft 120 has a smaller hexagonal portion 121 for coupling to an encoding unit 21, and a larger hexagonal portion 122 for penetrating the hexagonal axial hole 112 of the roller 110. Because the sectional area of the hole 112 is larger than the area of the larger hexagonal portion 122, the roller is movable on the shaft 120. However, due to the configuration of the hexagonal portion 122 and the hexagonal hole 112, the rotation of the roller 110 still can force the shaft 120 to rotate simultaneously such that the shaft 120 will drive the encoding unit 21 to output a control signal. Therefore, the roller 110 is freely rotatable within the carriage 130. In addition, the roller 110 and the carriage 130 are also turnable in a fan-shaped movement relative to the coupling portion 134 while the roller 110 moves along the shaft. Finally, as a result of resilient element 135, the roller 110 and the carriage 130 are downwardly movable relative to the coupling portion 134 when sufficient downward pressure is placed on the roller to overcome the upward bias of resilient element 135, the recess 138 facilitating the downward movement.

The encoding unit 21 and a plurality of micro-switches 22 are located on a circuit board 140, and the bottom of the carriage 130 and a vertical extension 139 are movable within the opening 141 of the circuit board 140. However, the range of the fan-shaped movement of the carriage 130 is limited by the vertical extension 139 moving within the opening 141.

The bottom 150 can be an extra bottom plate or any portion of a housing of a device. The circuit board 140 is mounted on the posts 153 evenly so as to form a space therebetween, and the resilient element 135 is positioned between the hole 136 of the carriage 130 and the hole 152 of the bottom 150 to apply an upward bias to the carriage 130, and enabling the roller 110 and the carriage 130 is to be moved downward relative to the coupling portion 134.

The carriage 130 has freely movable extensions 137, which include a first extension 137a, a second extension 137b and a third extension 137c. In addition, the micro-switches 22 include a first switch 22a, a second switch 22b, and a third switch 22c. The distance between the extensions 137a, 137b, and 137c is shorter than that of switches 22a, 22b, and 22c.

Figure 4A:
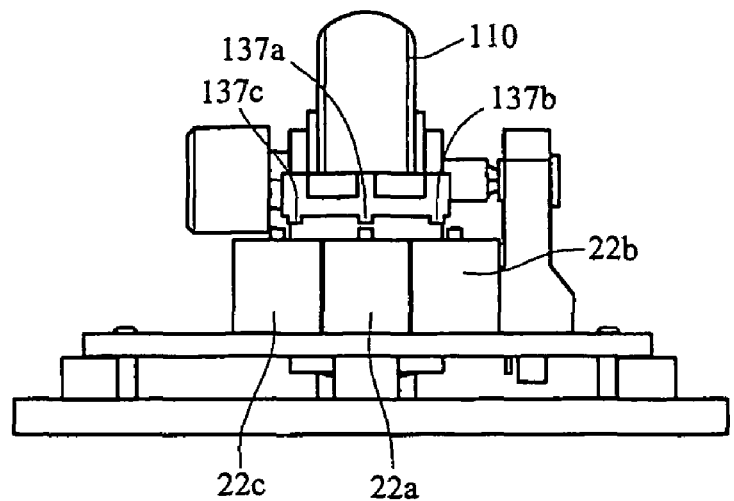
FIGS. 4A~4C are front views of the first preferred embodiment of the present invention showing the multiple movements of the roller.
Figure 4B:
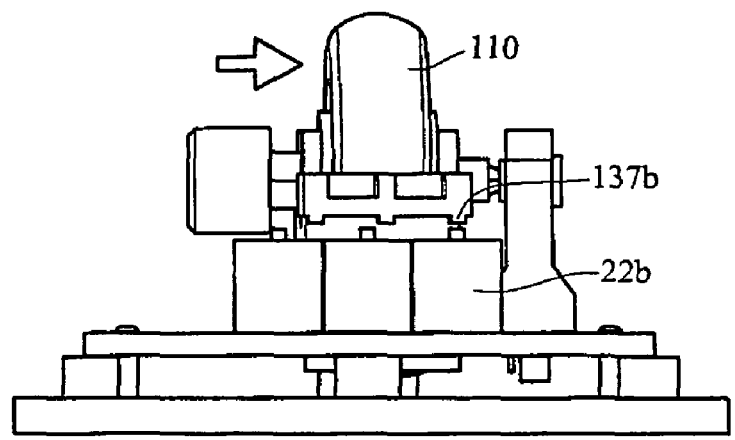
Figure 4C:
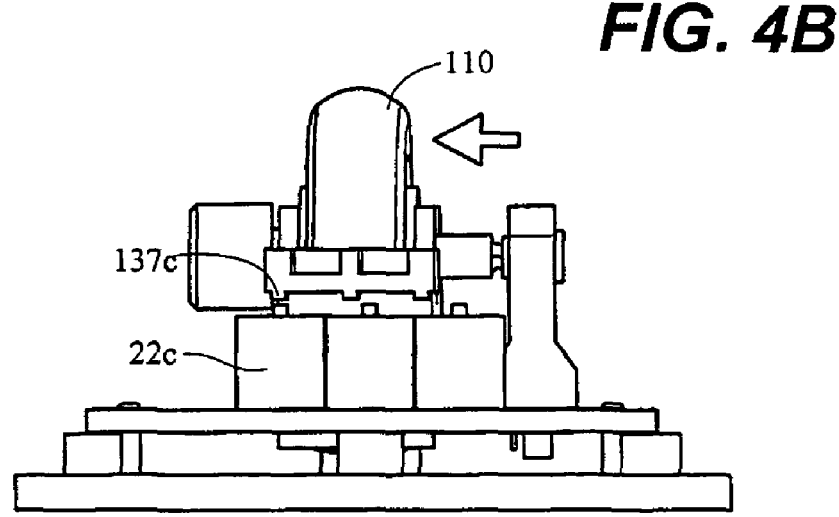

Referring to FIGS. 4A–4C, the roller 110 has a neutral position that enables the first extension 137a to be positioned just on the top of micro-switch 22a. The second and third extensions 137b and 137c are above the inward side of the switches 22b and 22c respectively. Once a user presses the roller 110 downward, the extension 137a will only activate the corresponding switch 22a causing a first control signal. However, once a user turns the roller 110 to the right side, the inner portion 111 of the roller 110 will push the carriage 130 to the right side. In the mean time, the roller 110 and the carriage 130 are turnable relative to the coupling portion 134 while the roller 110 is moving on the shaft 120 in a fan-shaped movement. After the fan-shaped movement, once the user presses the roller 110 downward, the extension 137b will only activate the corresponding switch 22b causing a second control signal.

Similarly, once a user turns the roller 130 to the left side, the inner portion 111 of the roller 110 will push the carriage 130 to the left side. In the mean time, the roller 130 and the carriage 130 are turnable relative to the coupling portion 134 while the roller 110 is moving on the shaft 120 in the above-described fan-shaped pivoting movement. After the fan-shaped movement, once the user presses the roller 110 downward, the extension 137c will only activate the corresponding switch 22c causing a third control signal.

Figure 5A:
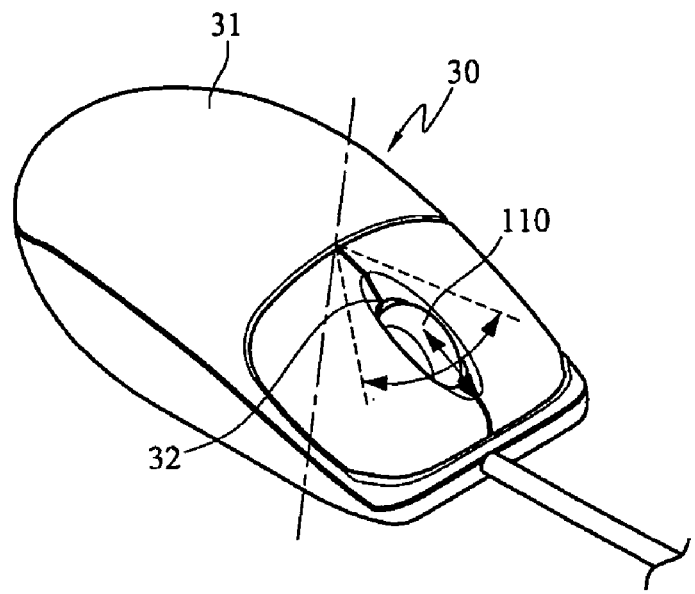
FIGS. 5A and 5B are perspective views of the first embodiment of the present invention showing the application to a computer mouse.
Figure 5B:
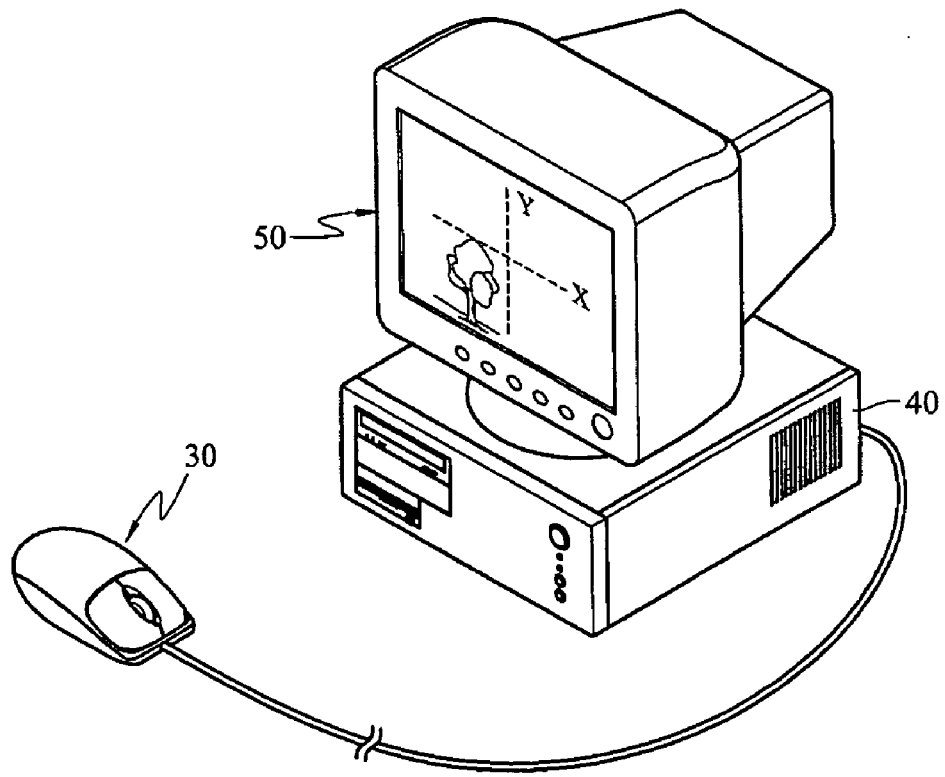

Referring to FIGS. 5A and 5B, the roller mechanism according to the present invention can be applied to, but is not limited to, a computer input device such as a computer mouse, trackball, keyboard, game controller, camera or the like. For example, a computer mouse 30 may include such a roller mechanism. The housing 31 has an opening 32 and the roller 110 is positioned therein. The roller 110 can carry out a fan-shaped movement within the opening 32.

Figure 6A:
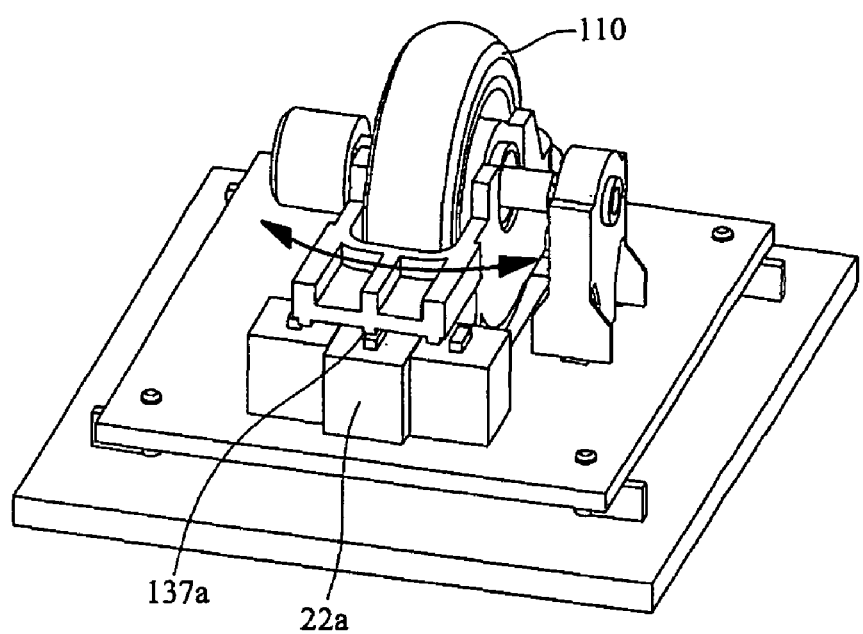
FIGS. 6A~8B are perspective views of the first preferred embodiment of the present invention showing the multiple movements of the roller.
Figure 6B:
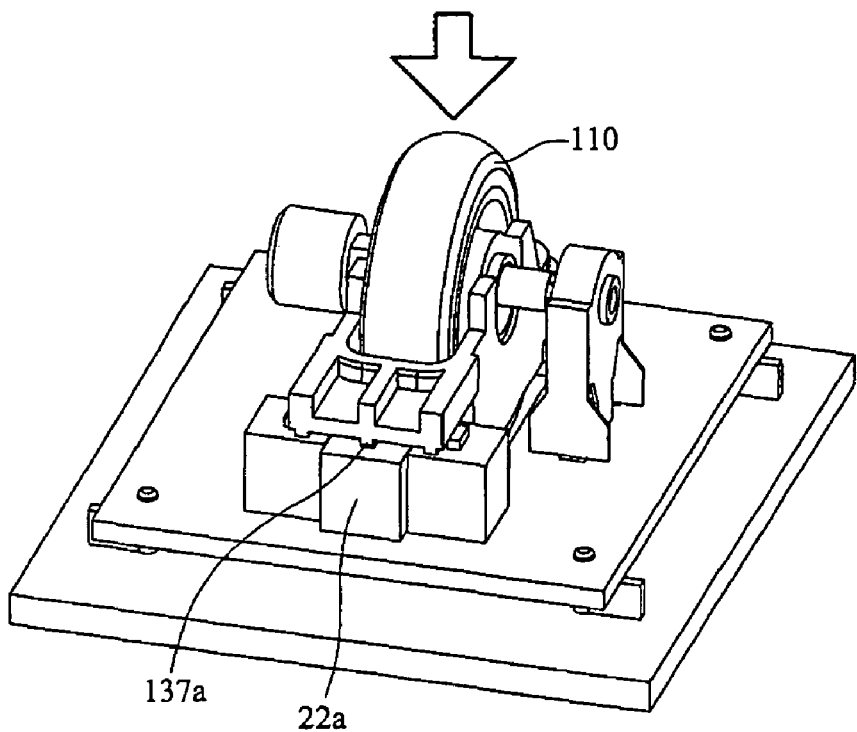

Referring to FIGS. 6A and 6B, the roller 110 has a neutral position that enables the first extension 137a to be positioned right on the top of the micro-switch 22a. Once a user presses the roller 110 downward, the extension 137a will only activate the corresponding switch 22a causing a first control signal, for example to execute a fast scrolling function.

Figure 7A:
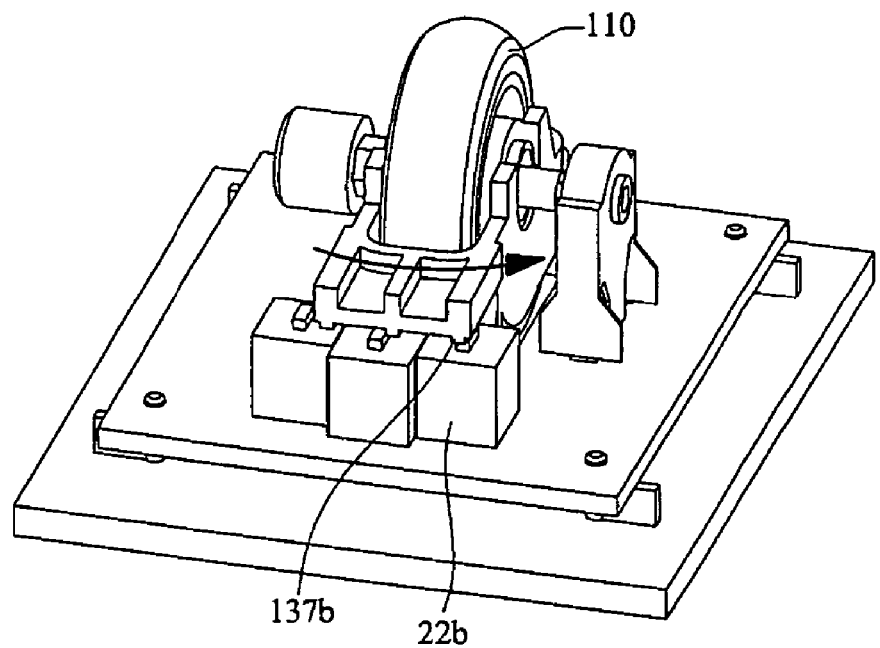
Figure 7B:
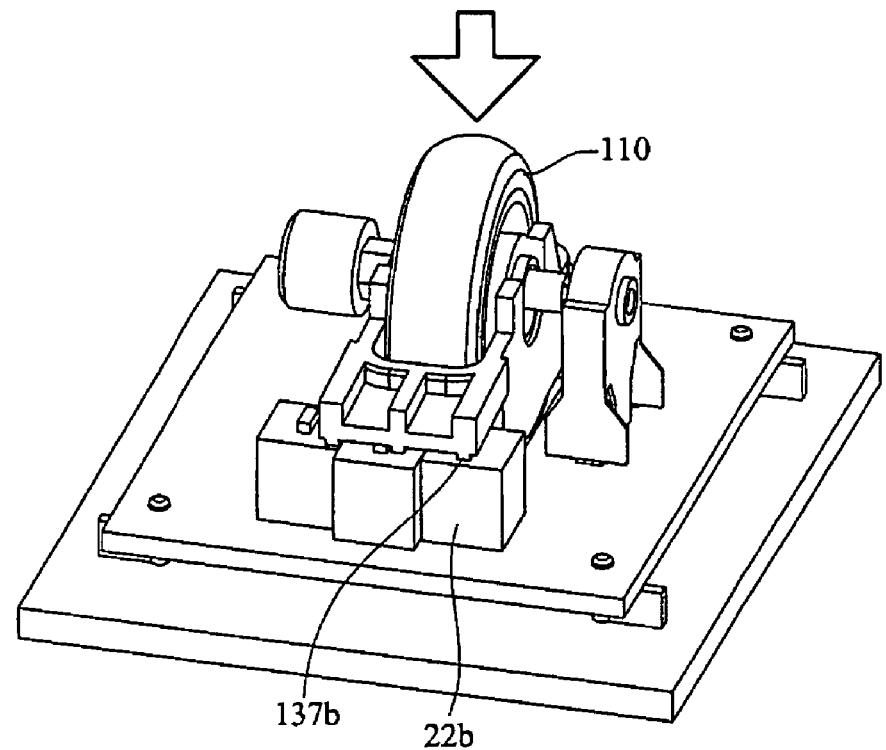

Referring to FIGS. 7A and 7B, once a user turns the roller 110 to the right side, and the user presses the roller 110 downward, the extension 137b will only activate the corresponding switch 22b causing a second control signal, such as a right horizontal scrolling signal.

Figure 8A:
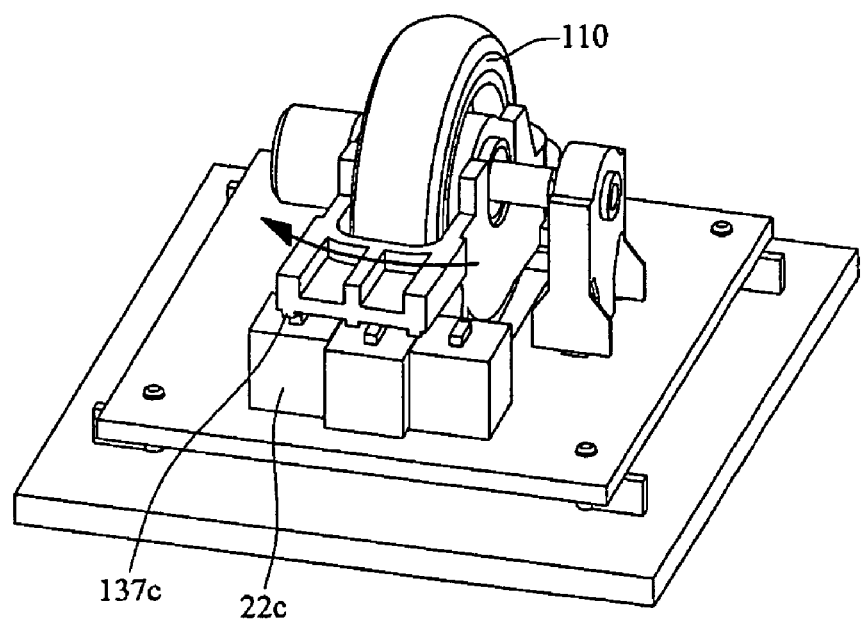
Figure 8B:
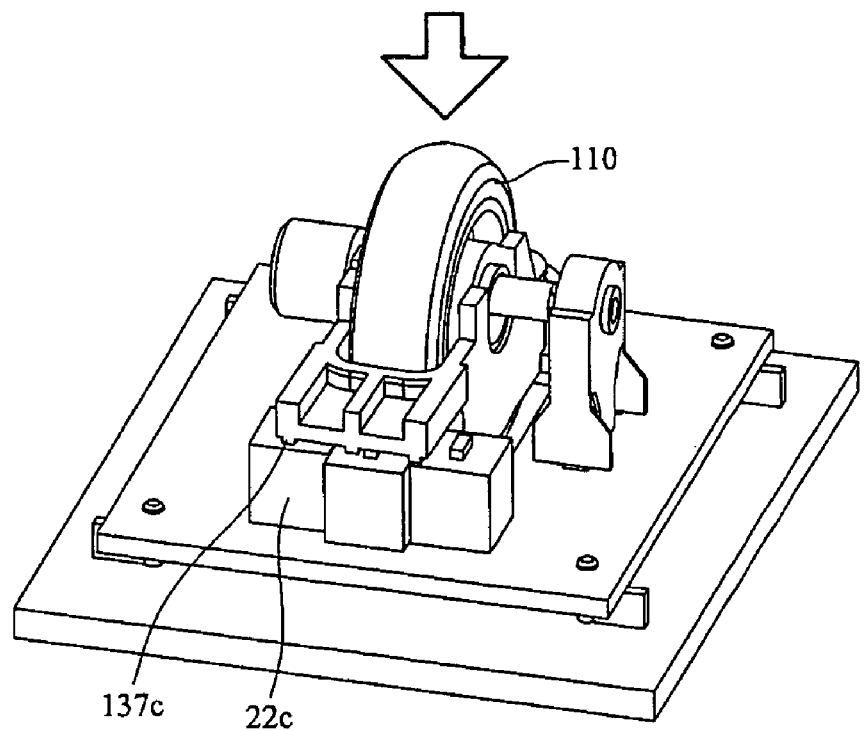

Referring to FIGS. 8A and 8B, once a user turns the roller 110 to the left side, and the user presses the roller 110 downward, the extension 137c will only activate the corresponding switch 22c causing a third control signal, such as a left horizontal scrolling signal.

Figure 9A:
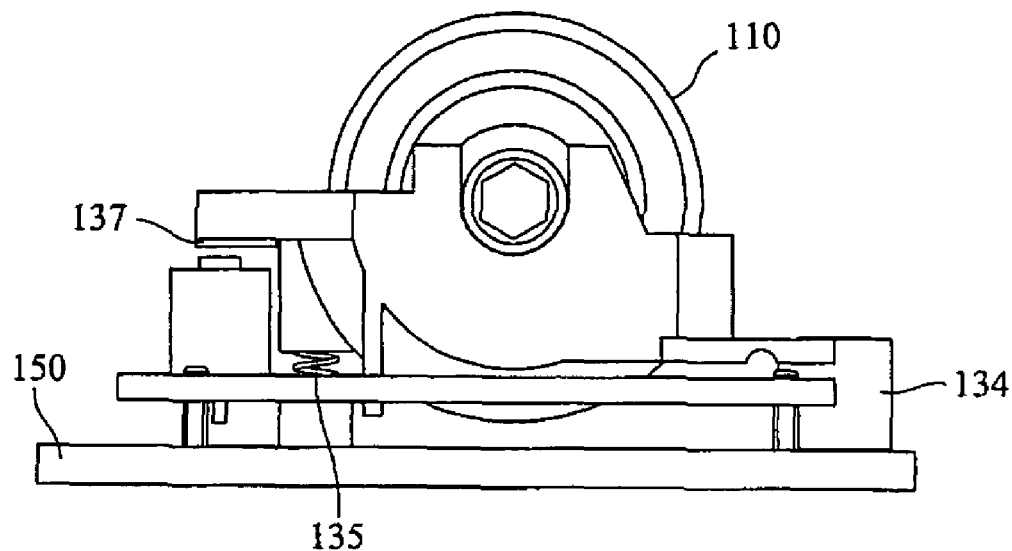
FIGS. 9A and 9B are lateral views of the first preferred embodiment showing the downward movement of the roller.
Figure 9B:
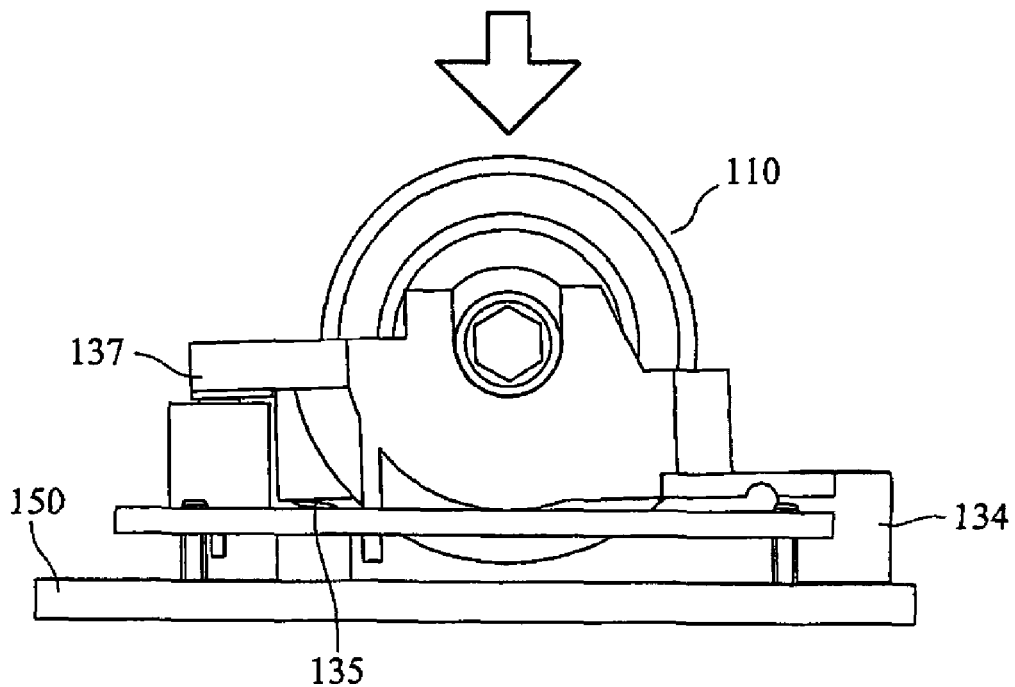

The roller 110 is freely rotatable within the carriage 130, and the rotation of the roller 110 can force the shaft 120 to rotate together such that the shaft 120 will drive the encoding unit 21 to output a control signal, such as an upward or downward vertical scrolling signal. Referring to FIGS. 9A and 9B, once the roller is pressed downward, the roller 110 will be lifted by the resilient element 135 when the downward force is released. No matter whether the roller 110 is turned to the left or the right, once the lateral force is released, the resilient element 135 will restore the carriage 130 to its neutral position.

Figure 10A:
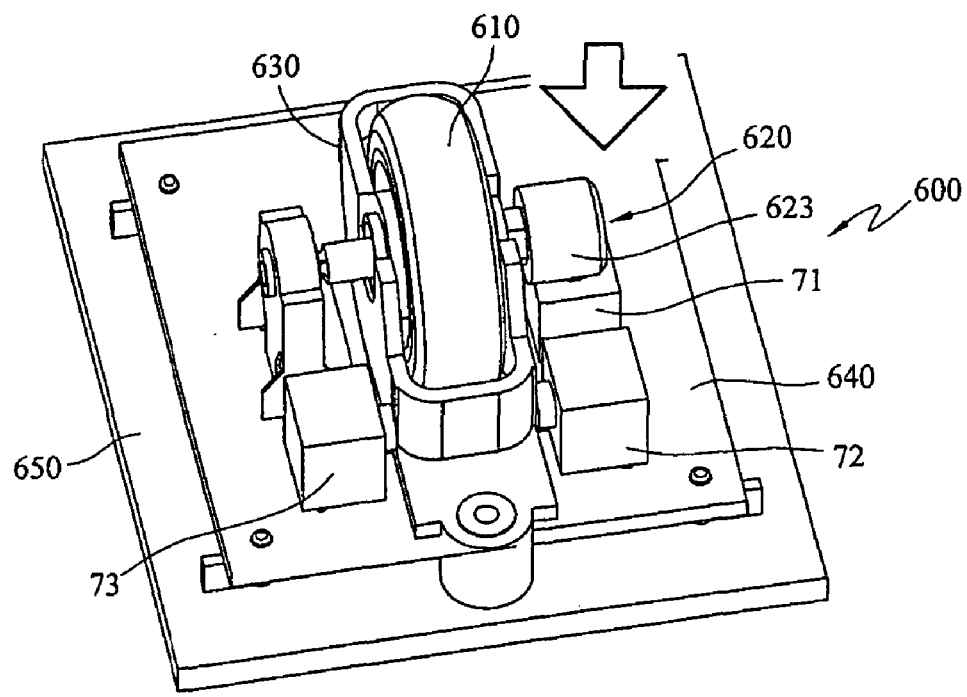
FIGS. 10A~12B are perspective views of a second preferred embodiment of the present invention showing the multiple movements of the roller.
Figure 10B:
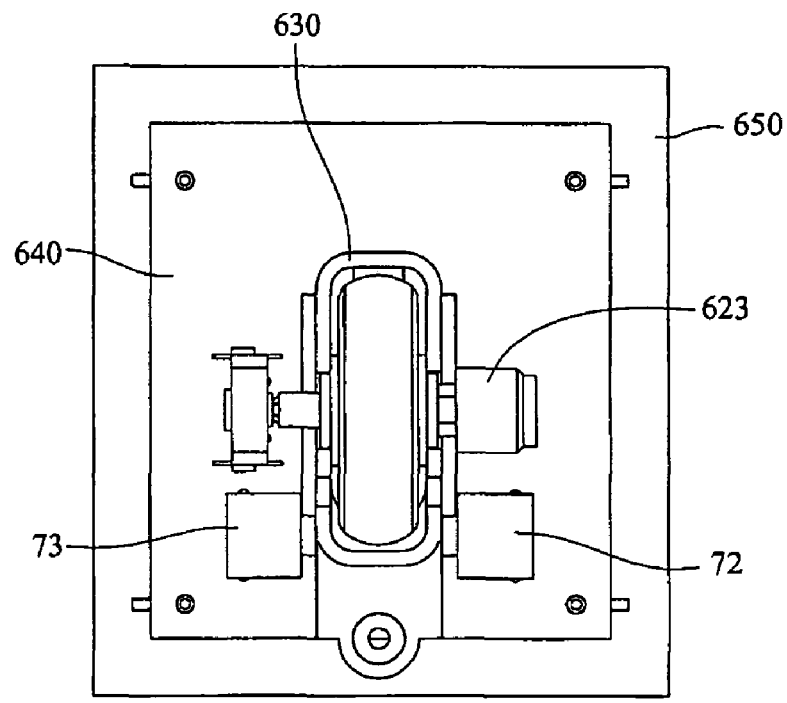

Referring to FIGS. 10A and 10B, the roller mechanism 600 has a roller 610, a shaft 620, a carriage 630, a circuit 640 and a bottom 650. The roller 610 has a neutral position that enables a free end 623 of the shaft 620 to be positioned right on the top of the micro-switch 71. Once a user presses the roller 610 downward, the free end 623 will be forced to move downward and activate the corresponding switch 71 causing a first control signal, for example to activate a fast scrolling function.

Figure 11A:
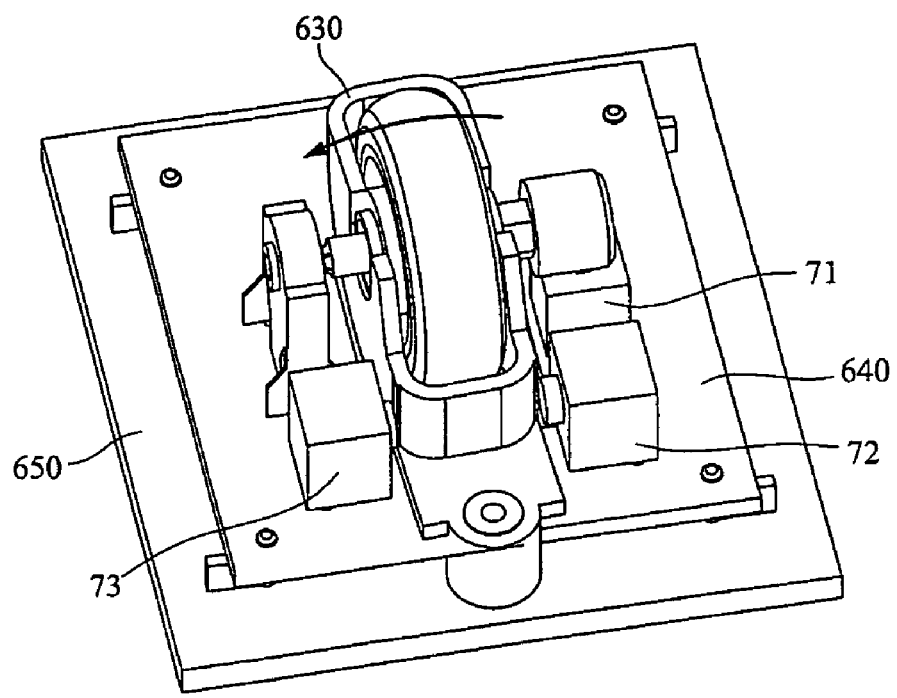
Figure 11B:
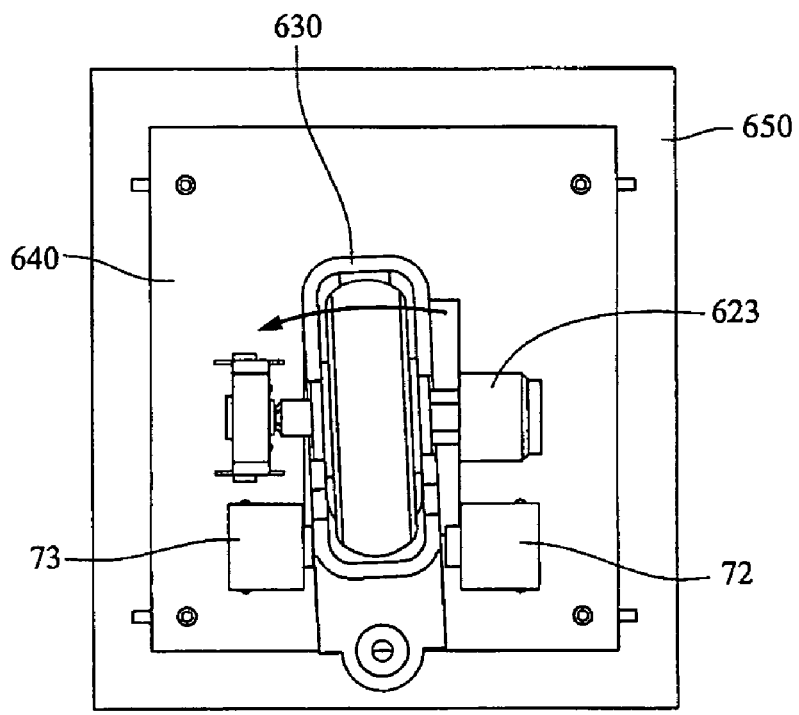

Referring to FIGS. 11A and 11B, once a user turns the roller 610 to the left side, the carriage 630 will directly activate the corresponding switch 73 causing a second control signal, such as a left horizontal scrolling signal.

Figure 12A:
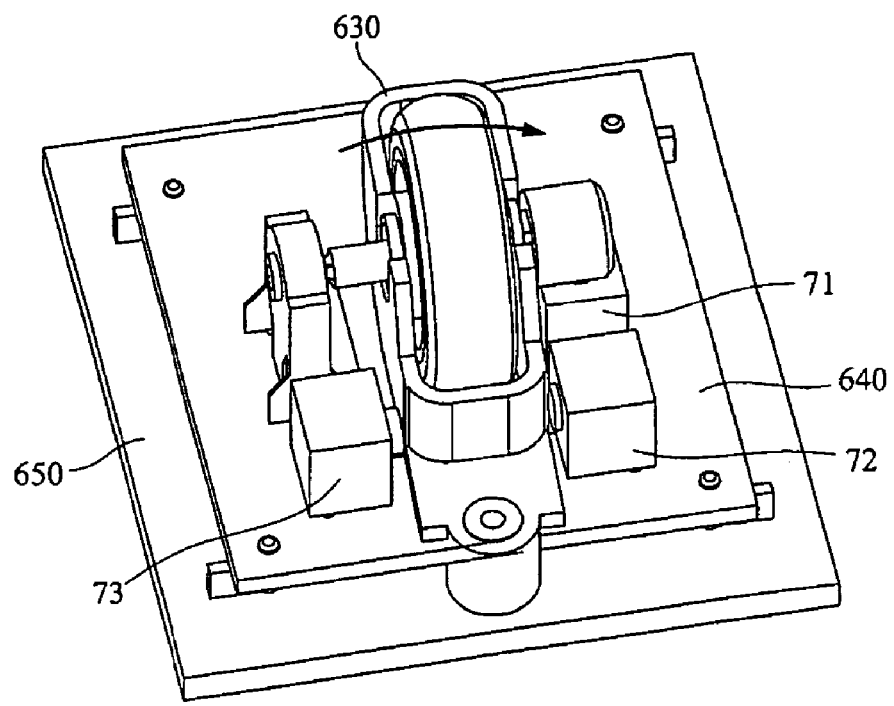
Figure 12B:
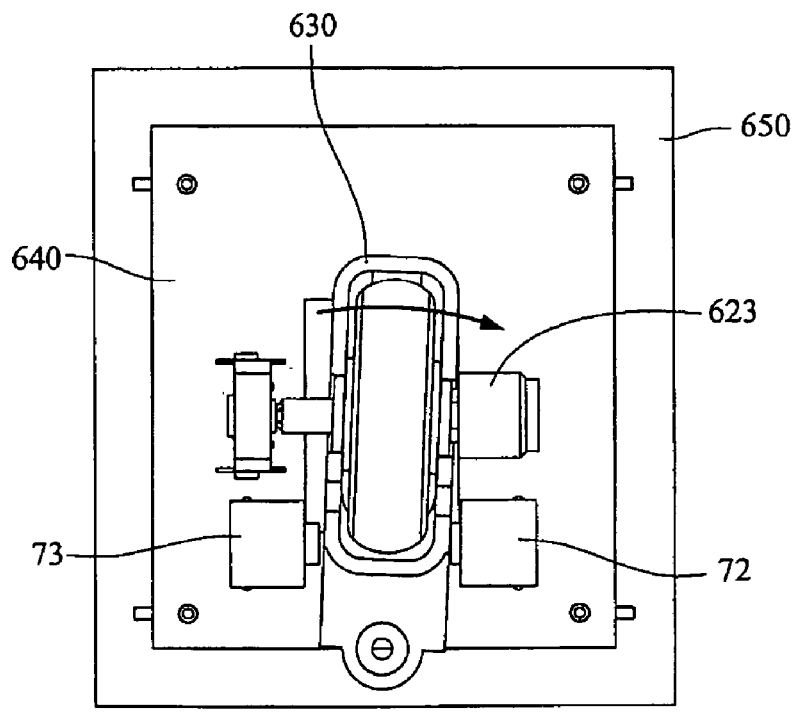

Referring to FIGS. 12A and 12B, once a user turns the roller 610 to the right side, the carriage 630 will directly activate the corresponding switch 72 causing a third control signal, such as a right horizontal scrolling signal.

The roller 610 of this embodiment is also freely rotatable within the carriage 630, and the rotation of the roller 610 can force the shaft 620 to rotate together such that the shaft 620 will drive the encoding unit 21 to output a control signal, for example an upward or downward vertical scrolling signal.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A roller mechanism, comprising:
a carriage and a roller having a shaft, the roller being rotatable within the carriage;
an encoding unit positioned on a circuit board and outside the carriage, the encoding unit being driven by the shaft and arranged to output a control signal;
wherein a first end of the carriage has a coupling portion, and the coupling portion is pivoted to a bottom member such that:
the shaft rotates with the roller to drive the encoding unit; and
the roller and the carriage are movable relative to the shaft and the coupling portion, the roller being rotatable with the shaft and the roller and the carriage being movable along the shaft as the carriage pivots to carry out a fan-shaped movement relative to the circuit board while the roller is rotating on the shaft.

2. The roller mechanism as claimed in claim 1, wherein the roller is arranged to be pressed downward relative to the coupling portion such that the carriage activates a corresponding micro-switch.

3. The roller mechanism as claimed in claim 2, wherein the carriage has a neutral position; the carriage is arranged to be turned to a first turning position and a second turning position; and the roller is arranged to be pressed downward at each of the positions for activating the corresponding micro-switch.

4. The roller mechanism as claimed in claim 2, wherein the carriage at least has an extension for activating the corresponding micro-switch.

5. The roller mechanism as claimed in claim 1, wherein the carriage is turnable relative to the coupling portion for activating a corresponding micro-switch.

6. The roller mechanism as claimed in claim 5, wherein the carriage has a neutral position, and the carriage can be turned to a first turning position or a second turning position for activating the corresponding micro-switch.

7. The roller mechanism as claimed in claim 5, wherein the carriage at least has an extension for activating the micro-switch.

8. The roller mechanism as claimed in claim 1, wherein the roller is arranged to be pressed downward such that one end of the shaft is moved downward to activate a corresponding micro-switch.

9. The roller mechanism as claimed in claim 1, wherein the carriage has a free second end, and a resilient element positioned between the second end and the bottom to bias the free second end of the carriage in an upward direction.

10. The roller mechanism as claimed in claim 1, wherein a circuit board is mounted on the bottom, and the encoding unit is located on the circuit board.

11. A computer peripheral device, comprising a roller mechanism and a housing for accommodating the roller mechanism,
the roller mechanism further comprising:
a carriage and a roller having a shaft, the roller being rotatable within the carriage; and
an encoding unit positioned on a circuit board and outside the carriage, the encoding unit being driven by the shaft and arranged to output a control signal;
wherein a first end of the carriage has a coupling portion, and the coupling portion is pivoted to a bottom member such that:
the shaft rotates with the roller to drive the encoding unit; and
the roller and the carriage are movable relative to the shaft and the coupling portion, the roller being rotatable with the shaft and the roller and the carriage being movable along the shaft as the carriage pivots to carry out a fan-shaped movement relative to the circuit board while the roller is rotating on the shaft.

12. The roller mechanism as claimed in claim 11, wherein the roller is arranged to be pressed downward relative to the coupling portion such that the carriage activates a corresponding micro-switch.

13. The roller mechanism as claimed in claim 11, wherein the carriage is turnable relative to the coupling portion for activating a corresponding micro-switch.

14. The roller mechanism as claimed in claim 11, wherein the roller is arranged to be pressed downward such that one end of the shaft is forced downward to activate a corresponding micro-switch.

15. The roller mechanism as claimed in claim 11, wherein the carriage has a free second end, and a resilient element is positioned between the second end and the housing for biasing the second end in an upward direction.

* * * * *